United States Patent [19]

Yamanishi et al.

[11] Patent Number: 5,115,103
[45] Date of Patent: May 19, 1992

[54] INSULATED CONDUCTOR AND METHOD OF PRODUCING THE SAME

[75] Inventors: Toru Yamanishi; Tatsuya Kakuta, both of Kanagawa; Akinori Mori, Tochigi, all of Japan

[73] Assignee: Sumitomo Electric Industries, Ltd., Osaka, Japan

[21] Appl. No.: 446,679

[22] Filed: Nov. 6, 1989

[30] Foreign Application Priority Data

Dec. 13, 1988 [JP] Japan .................................. 63-312923
Feb. 27, 1989 [JP] Japan .................................... 1-43153

[51] Int. Cl.⁵ .............................................. H01B 7/00
[52] U.S. Cl. ..................................... 174/24; 174/101.5; 427/54.1; 427/117; 427/120; 428/313.5; 428/313.9; 428/327
[58] Field of Search .................... 174/24, 101.5; 428/313.5, 313.9, 325, 327; 427/54.1, 117, 120

[56] References Cited

U.S. PATENT DOCUMENTS

| | | | |
|---|---|---|---|
| 3,573,976 | 4/1971 | Duane | 428/381 X |
| 3,744,016 | 7/1973 | Davis | 174/101.5 X |
| 4,141,055 | 2/1979 | Berry et al. | 428/313.9 X |
| 4,238,641 | 12/1980 | Planting et al. | 174/88 C |
| 4,273,806 | 6/1981 | Stechler | 427/119 |
| 4,770,928 | 9/1988 | Gaworowski et al. | 428/313.5 X |
| 4,816,618 | 3/1989 | Bongianni | 427/119 X |
| 4,879,148 | 11/1989 | Neaves et al. | 428/147 X |

Primary Examiner—Morris H. Nimmo
Attorney, Agent, or Firm—Cushman, Darby & Cushman

[57] ABSTRACT

This invention relates to a novel coating structure composed of a mixture of an energy irradiation curable resin composition and microspheres, which is used to form a thinfilm coating on a small diameter conductor, thus producing an insulated conductor which has low capacitance obtained in spite of the thin-film coating, has very little variation in capacitance due to the manufacturing process, has a smooth coating layer, and can be manufactured quickly.

5 Claims, 1 Drawing Sheet

INSULATED CONDUCTOR AND METHOD OF PRODUCING THE SAME

FIELD OF THE INVENTION

The present invention relates to an insulated conductor of small diameter and having a low dielectric constant and a method of producing the same.

BACKGROUND OF THE INVENTION

A foaming and extruding technique as described in Japanese Patent Post-examination Publication No. 57-30253 is known as one prior art technique for forming a thin-film insulating layer on a conductor. In general, according to the technique, an insulating layer having a low dielectric constant can be produced with a large void ratio obtained by foaming a polyolefin resin by use of any one of several chemical foaming agents, such as azodicarbonamide and the like, inert gases, such as nitrogen gas, argon gas and the like, and gas-like or liquid-like hydrocarbons or fluorocarbons.

On the other hand, there is a known method, as described in U.S. Pat. No. 3,953,566 and U.S. Pat. No. 4,187,390, in which an insulating layer is formed by winding a fluororesin tape having a large void ratio on a conductor while extending. According to the method, stability of the dielectric constant of the insulating layer can be maintained more easily compared with the foaming and extruding technique, because a tape material having a known dielectric constant is wound on a conductor. Further, according to the method, a thin-film and high-void-ratio insulated layer can be put into practical use.

Further, Japanese Patent Unexamined Publication (OPI) Nos. 56-43564 and 57-39006 have proposed a method for fusing and extruding microspheres or foam microspheres formed of an inorganic material, such as glass, alumina or the like, having a particle diameter of several $\mu$m to several mm and coated with a thermoplastic resin, and a method for producing an insulated conductor comprising the steps of: dissolving a thermoplastic resin, such as polyethylene, polyvinyl chloride or the like, in a solvent such as xylene or the like; applying the resulting solution on a conductor; and drying the resulting solution.

Recently, a need for a signal transmission line which is small in diameter but high in density has increased in the medical field, the computer measuring field and other fields. Therefore, development of a small-diameter insulated conductor formed by applying a thin coating on a small-diameter conductor and having a low dielectric constant has been hastened.

Of the aforementioned prior art techniques, the method as described in the Japanese Patent Post-examination Publication No. 57-30253 has a disadvantage in that the thickness of the coating layer is limited to not less than 200 $\mu$m, because fusion of a polyolefin resin, foaming thereof and application thereof onto a conductor are carried out simultaneously by a screw extruder to thereby make it difficult to attain a high foaming rate in the thin-film insulating layer. Furthermore, the method has a disadvantage in that the foaming rate cannot be controlled easily.

On the other hand, the method described in each of the U.S. Pat. Nos. 3,953,566 and 4,187,390 has a problem in that partial unevenness of the surface of the insulating layer cannot be avoided, and the manufacturing linear speed is very slow.

The methods described in the Japanese Patent Unexamined Publication (OPI) Nos. 56-43564 and 57-39006 have the following disadvantages, though the foaming rate can be controlled easily.

In the former method for extruding and applying hollow or foam balls coated with a thermoplastic resin, the thermoplastic resin covering the surface of each microsphere is fused, applied on the conductor and then cooled to join the microsphere. Accordingly, as the thermoplastic resin layer is thinned for the purpose of attaining a high void ratio, the mechanical strength, particularly the elongation rate, of the insulating layer formed on the conductor are lowered remarkably. As the thermoplastic resin layer of the microsphere is thickened to maintain the mechanical strength of the insulating layer, the void ratio decreases so that the dielectric constant of the insulated conductor increases. Further, because a temperature of at least 150° C. and high pressure are required within the extruder, the material used for the microsphere is limited to inorganic materials, such as glass, alumina and the like. And, since each of the materials for the microsphere has such a high intrinsic dielectric constant, a cable with a low dielectric constant and low loss cannot be produced.

The latter method for producing an insulated conductor comprises the steps of: dissolving a thermoplastic resin, such as polyethylene, polyvinyl chloride or the like, and inorganic-material microspheres in a solvent such as xylene or the like; applying the resulting solution on a conductor; and drying the resulting solution, with heating being required for drying, similar to the former method. Since the material used for the microsphere is also limited, it is, like the former method, difficult to produce a cable with a low dielectric constant and low loss. Further, the manufacturing speed is very slow, because the solvent in the applied liquid-like composition is evaporates.

It is therefore an object of the present invention to provide an insulated conductor which has excellent electrical characteristics, in particular, a low dielectric constant, and which has a small diameter of not larger than 200 $\mu$m, which thereby eliminates the disadvantages in the prior art.

SUMMARY OF THE INVENTION

As a result of research and effort to attain the above mentioned object, the applicants have found that an insulated conductor having a small diameter and low capacitance, a combination not realized in the prior art, can be put into practical use by a novel coating structure, which is the present invention.

In short, the present invention is directed to an insulated conductor formed by coating a conductor with an insulating layer, the insulating layer being composed of a mixture of an energy irradiation curable resin composition and microspheres. The insulated conductor is excellent in that low capacitance can be obtained in spite of thin-film coating, variations in capacitance due to the manufacturing process are less, the coating layer is smooth, and high-speed manufacture is possible. The microspheres used herein may be all of equal mean diameter or may be of at least two different mean diameters.

Further, the aforementioned insulated conductor is embodied in the present invention by a method of producing an insulated conductor comprising the steps of:

mixing microspheres in an energy irradiation curable resin composition to prepare a coating resin composition; applying the coating resin composition on the outer surface of a conductor; and hardening the coating resin composition through energy irradiation to thereby form a coating layer.

BRIEF DESCRIPTION OF THE DRAWINGS

FIG. 1A is an enlargement of the circular portion of FIG. 1;

FIG. 2A is an enlargement of the circular portion of FIG. 2;

DESCRIPTION OF THE OF THE PREFERRED EMBODIMENT

Figure 1:
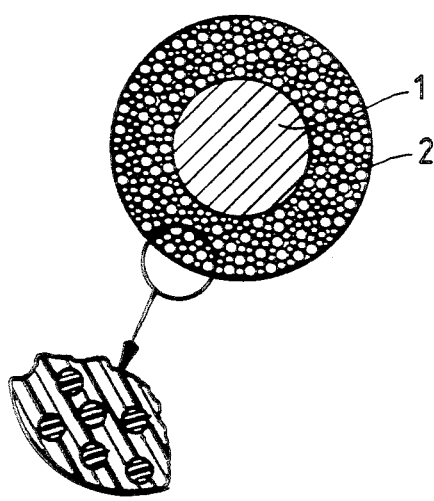
FIG. 1 is a sectional view of a first embodiment of the insulated conductor according to the present invention.

The energy irradiation curable resin composition used in the present invention is preferably an ultraviolet-ray curable resin composition. The coating resin composition used in the present invention is an energy irradiation curable resin composition or a mixture of an energy irradiation curable resin and microspheres contained therein.

The microspheres used in the present invention each contain air or another gas, such as nitrogen gas, argon gas, isobutane gas or the like; and has a shell portion made of any suitable material selected from thermoplastic resins, such as vinylidene chloride-acrylonitrile copolymer, polyethylene, fluororesin and the like; thermocurable resins, such as epoxy resin, phenol resin, urea resin and the like; and inorganic materials, such as silica, alumina, carbon, zirconia, modifications thereof, and the like.

In the case where the microspheres are made of an inorganic material, the surfaces of the microspheres may be treated with a silane coupling agent or the like. Vinylidene chloride-acrylonitrile copolymer or the like is preferably employed, compared with silica, from the point of view of lowering its dielectric constant.

The microspheres preferably have mean diameters within a range of from 1 to 100 $\mu m$ $\phi$ and shell thicknesses no greater than 0.5 $\mu m$ to attain a coating layer with a low dielectric constant and a thickness no greater than 200 $\mu m$. This is because the void ratio is increased by mixing the microspheres without lowering the smoothness of the coating layer.

To further improve the effect of the present invention, at least two kinds of microspheres which have differing mean diameter can be selected from microspheres having mean diameters within a range of 1 to 100 $\mu m$ $\phi$ and a shell thickness of not larger than 0.5 $\mu m$. This makes it possible to increase the void ratio by mixing the microspheres without decreasing the smoothness of the coating layer. The microspheres which differ in mean diameter may be made of the same or different materials. It is however preferable that the dielectric constant of the material for the smaller mean diameter microspheres not be higher than the dielectric constant of the material for the larger mean diameter microspheres.

Examples of the energy irradiation curable resin composition related to the present invention include a thermocurable resin, an ultraviolet-ray curable resin, and an electron beam curable resin. From the standpoint of forming a coating quickly, an ultraviolet-ray curable resin is preferred.

Examples of the energy irradiation curable resins used herein include silicone resin, epoxy resin, urethane resin, polyester resin, epoxy acrylate, urethane acrylate, fluoracrylate, silicone acrylate, polyester acrylate, and the like.

To reduce the capacitance of the coating, it is preferable that the dielectric constant of the energy irradiation curable resin composition be low. Accordingly, the dielectric constant of the energy irradiation curable resin should not be larger than 4.0, preferably not larger than 3.0.

To reduce the dielectric constant of the energy radiation setting resin, it is particularly preferable that the resin be selected from silicone resin, fluoracrylate, silicone acrylate and the like.

In general, additives, such as foaming agents, oxidation inhibitors, light stabilizers, resin coupling agents, surface treating agents, particle dispersing agents, and the like, when added to the coating resin of this type insulating conductor, are effective for improving the low capacitance in the coating resin, while also improving the stability, mechanical characteristics, functional characteristics and the like.

Preferably, the microspheres and the energy irradiation curable resin are mixed in a volumetric proportion not less than 1:1. This is because when the volumetric proportion is less than 1, the void ratio of the coating resin produced by mixing the microspheres is less than 40% thereby making it impossible to obtain a coating layer of low capacitance and low dielectric constant.

Further, where a coating layer produced by a resin composition formed by mixing microspheres different in mean diameter is used, the preferred range of the diameter of the microspheres used in the present invention is as follows. When, for example, two kinds of microspheres different in mean diameter are used, the two kinds preferably satisfy the relation $r_2/r_1 \leq 0.224$ in which $r_1$ represents the mean diameter of one kind of microsphere, 1, and $r_2$ represents the mean diameter of the other kind of microsphere, 2. When, for example, n kinds of microspheres are used, the n kinds are preferably selected to satisfy the relation $$r_{(i+1)}/r_{(i)} \leq 0.224$$

where i = 1, 2, 3 ... n $$r_{(i+1)} \leq r_{(i)}.$$

Further, it is preferable that the range of the viscosity of the coating resin composition, after mixing the microspheres and the energy irradiation curable resin, is from 100 to 100,000 cps. In particular, to make the application of the coating resin composition easy, the range of the viscosity is preferably from 1,000 to 10,000 cps. Among the energy irradiation curable resins therefore, ultraviolet-ray curable resin is suitable to prepare the coating resin composition of 1,000 to 10,000 cps, because the viscosity thereof can be selected freely.

Although the coating thickness is not limited specifically, the preferred thickness should not be larger than 500 μm in order to harden the energy radiation setting resin sufficiently.

The conductor of the present invention is not limited specifically. A known electrical conductor, for example, copper, aluminum, alloys thereof, or conductors plated with the above mentioned metals, or the like, can be used.

The present invention will be described more in detail below with reference to the drawings.

FIG. 1 is a sectional view of a first embodiment of the insulated conductor according to the present invention.

In FIG. 1, the reference numeral 1 designates a conductor, and 2 designates an insulating layer which is a coating of a mixture of microspheres and an energy irradiation curable resin.

Figure 2:
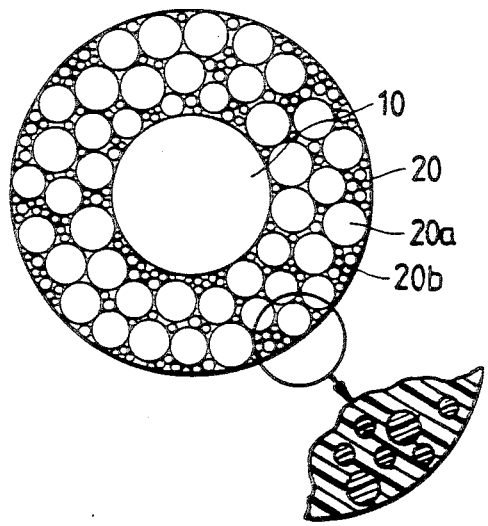
FIG. 2 is a sectional view of a second embodiment of the insulated conductor according to the present invention.

FIG. 2 is a sectional view of a second embodiment of the insulated conductor according to the present invention. In FIG. 2, the reference numeral 10 designates a conductor, 20 designates an insulating layer which is a coating of a mixture of microspheres and an energy irradiation curable resin, 20a designates large-diameter microspheres, and 20b designates small-diameter microspheres.

In the following, the method of producing the insulated conductor according to the present invention is described with reference to one embodiment of the present invention shown in FIG. 3.

Figure 3:
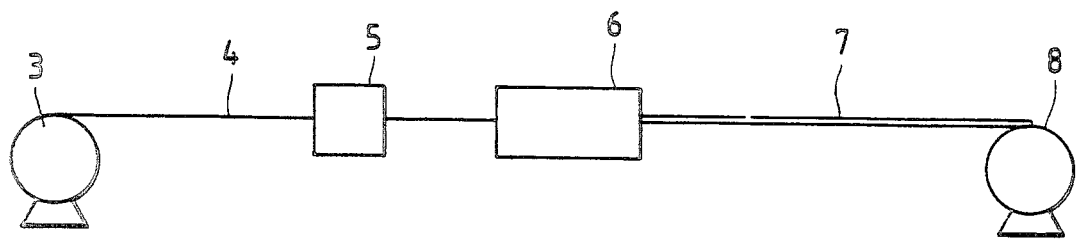
FIG. 3 is a schematic view showing a method of producing the insulated conductor according to the present invention.

A coating resin composition comprising a mixture of microspheres of the same mean diameter and an energy irradiation setting resin or a mixture of at least two kinds of microspheres different in mean diameter and an energy irradiation curable resin is applied to the outer surface of the conductor 4 fed out from a supply means designated by the numeral 3 in FIG. 3. The coating resin composition thus applied is subjected to irradiation of energy, such as heat, ultraviolet rays, an electron beam, or the like, supplied from a resin hardening means 6, so that the coating resin composition is hardened to form a coating on the conductor 4 to thereby prepare an insulated conductor 7 according to the present invention. The reference numeral 8 designates a takeup means. The resin coating device 5 is the means by which the coating resin composition containing microspheres and having a relatively high viscosity can be uniformly applied. Known techniques, such as a technique of coating by use of a pressure die, a technique of dipping by use of an open die, and the like, can be used as the resin coating device 5.

How such an insulated conductor, which is small in diameter and low in capacitance and which could not have been realized in the prior art, can be realized by the present invention is explained.

In order to explain the operation of the present invention, the relation of the void ratio and the dielectric constant will be described. The void ratio V is measured by a density method and calculated by the following equation (1).

$$(\rho_0 - \rho)/\rho_0 \times 100 \, (\%) \tag{1}$$

$\rho_0$ represents the density of base resin, and $\rho$ represents the density of microsphere-containing resin.

It is well known that the dielectric constant, $\epsilon$, of a microsphere-containing resin composition is determined by the dielectric constant $\epsilon_1$ of the base resin, the dielectric constant $\epsilon_2$ of a gas contained in the microsphere, and the void ratio V produced by mixing the microspheres in the base resin, and that the dielectric constant $\epsilon$ is represented by the following equation (2), when shell thickness of the microsphere is very thin and the dielectric constant of the shell material is negligible.

$$\epsilon = \epsilon_1 \cdot \frac{2\epsilon_1 - \epsilon_2 - 2V(\epsilon_1 - \epsilon_2)}{2\epsilon_1 + \epsilon_2 - V(\epsilon_1 - \epsilon_2)} \tag{2}$$

Accordingly, desired voids can be formed stably in the coating layer by selecting the material for forming the microspheres, the void ratio thereof, the content of the microspheres in the resin composition, and the material for the resin composition, respectively, and it is therefore possible to form an insulating layer having a desired dielectric constant.

To establish the dielectric constant $\epsilon$ to be a low value not larger than 1.60, which is a target of the present invention, the dielectric constant $\epsilon_1$ of the base resin must be selected so as to increase the void ratio to a value larger than 40% because the lowest dielectric constant of all resin, which fluorocarbon resin has, is 2.

In the case where the base resin is required to be subjected to a high temperature for hardening, there is a risk that the gas contained in the microspheres may expand and contract and that the microspheres may become deformed with the result that the void ratio cannot be maintained. On the contrary, where ultraviolet-ray curable resin is used as the energy irradiation curable resin in the present invention, the microspheres which help give the resin a low-dielectric constant can be used because it is not necessary to heat the ultraviolet-ray curable resin to harden it. Also, an added way of attaining a very low dielectric constant in the resin is by selecting a resin with an intrinsically low dielectric constant as the energy irradiation curable resin.

Because the microspheres have a mean diameter within a range of about 1 to about 100 μm and a shell thickness not larger than 0.5 μm, voids can be formed securely even if the coating is made of a thin film. Accordingly, it is possible to produce an insulated conductor capable of high-speed transmission in which the capacitance of the insulating layer is not larger than 1.60, which would not have been possible in the prior art products, even where the thickness of the insulating layer is not larger than 200 μm.

Further, according to the present invention, an energy irradiation curable resin composition containing microspheres is applied and then hardened through energy irradiation, such as heat, ultraviolet rays, an electron beam or the like. Accordingly, the manufacturing speed can be improved greatly, compared with the prior art means of either foaming a thermoplastic resin or winding up a tape.

Because the insulating layer is formed of a coating of a resin composition having a dielectric constant which is predetermined by selecting the content of the microspheres in the resin composition and the material for the resin composition as described above, it is possible to avoid variations in capacitance due to instability of the manufacturing process. Accordingly, it is possible to easily manufacture insulated conductors of stable quality.

Further, because the resin composition contains either microspheres all equal in mean diameter or microspheres of at least two different mean diameters, both of which are selected from microspheres having a particle diameter of from 1 to 100 μm, the present invention has a further advantage in that the surface of the insulating layer can be made much smoother as compared to the prior art.

EXAMPLE 1

Isobutane gas-containing vinylidene chloride-acrylonitrile copolymer resin microspheres having a 40 μm mean diameter and a 0.05 μm shell thickness (made by EXPANCELL Co.), and an ultraviolet-ray curable resin (dielectric constant: 2.50) mainly containing fluoroacrylate of 500 cps viscosity were mixed in the volumetric proportion 3:1 and dispersed with stirring to thereby prepare a coating resin composition having a viscosity of 8500 cps.

The outer surface of silver-plated copper wire having a 150 μm external diameter was coated with the prepared coating resin composition by use of a pressure-die coating apparatus and then the coating is hardened with radiation by use of an ultraviolet ray hardening apparatus consisting of a mercury lamp to thereby prepare an insulated conductor having a coating thickness of 100 μm and an external diameter of 350 μm according to the present invention.

When the void ratio of the insulating layer of the insulated conductor was measured by a density method, it was 70%. When the dielectric constant thereof was measured at a frequency of 1 MHz, it was 1.38. When the fracture elongation of the insulating coating of the insulated conductor was measured, it was 50%. Even though the insulated conductor was wound on a 1 mm φ mandrel, the coating was not broken. In short, the insulated conductor was flexible enough for practical usage.

EXAMPLE 2

Air-containing phenol resin microspheres having a 20 μm mean diameter and a 0.1 μm shell thickness, and an ultraviolet-ray setting resin (dielectric constant: 3.45) mainly containing urethane acrylate of 700 cps viscosity were mixed in the volumetric proportion 3:1 and dispersed with stirring to thereby prepare a coating resin composition having a viscosity of 9000 cps.

The outer surface of silver-plated copper wire having a 150 μm external diameter was coated with the prepared coating resin composition by use of a pressure-die coating apparatus and then hardened with irradiation by use of an ultraviolet-ray hardening apparatus with a mercury lamp to thereby prepare an insulated conductor having a coating thickness of 150 μm and an external diameter of 550 μm according to the present invention. The void ratio of the insulating layer of the insulated conductor was 70%. The dielectric constant thereof was 1.60 (at a frequency of 1 MHz).

When the fracture elongation of the insulating coating of the insulated conductor was measured, it was 50%. Even though the insulated conductor was wound on a 1 mm φ mandrel, the coating was not broken. In short, the insulated conductor was flexible enough for practical usage.

EXAMPLE 3

Air-containing glass microspheres having a 10 μm mean diameter and a 0.1 μm shell thickness, and a thermocurable resin (dielectric constant: 2.70) mainly containing silicone resin of 1000 cps viscosity were mixed in the volumetric proportion 2:1 and dispersed with stirring to thereby prepare a coating resin composition having a viscosity of 1200 cps.

The outer surface of tin-plated copper wire having a 200 μm external diameter was coated with the prepared coating resin composition by use of a pressure-die coating apparatus and then hardened by use of a heat hardening furnace of from 300° to 400° C. to thereby prepare an insulated conductor having a coating thickness of 150 μm and an external diameter of 550 μm according to the present invention. The void ratio of the insulating layer of the insulated conductor was 60%. The dielectric constant thereof was 1.59 (at a frequency of 1 MHz).

When the fracture elongation of the insulating coating of the insulated conductor was measured, it was 10%. Even though the insulated conductor was wound on a 5 mm φ mandrel, the coating was not broken. In short, the insulated conductor was flexible enough for practical usage.

EXAMPLE 4

Isobutane gas-containing vinylidene chloride acrylonitrile copolymer resin microspheres having a 40 μm mean particle diameter (0.05 μm shell thickness), isobutane gas-containing vinylidene chloride-acrylonitrile copolymer resin microspheres having a 8 μm mean particle diameter (0.05 μm shell thickness), and an ultraviolet-ray setting resin (dielectric constant: 3.45) mainly containing silicon acrylate of 500 cps viscosity were mixed in the volumetric proportion 22:0.8:1 and dispersed with stirring to thereby prepare a coating resin composition having a viscosity of 9000 cps.

The outer surface of silver-plated copper wire having a 200 μm external diameter was coated with the prepared coating resin composition by use of a pressure-die coating apparatus and then hardened wit radiation by use of an ultraviolet-ray hardening apparatus consisting of a mercury lamp to thereby prepare an insulated conductor having a coating thickness of 100 μm and an external diameter of 400 μm according to the present invention. When the void ratio of the insulating layer of the insulated conductor was measured by a density method, it was 71%. When the dielectric constant thereof was measured at a frequency of 1 MHz, a very low value of 1.55 was obtained.

COMPARATIVE EXAMPLE

One kind of isobutane gas-containing vinylidene chloride-acrylonitrile copolymer resin microspheres having a 40 μm diameter (0.05 μm shell thickness), and an ultraviolet-ray curable resin (dielectric constant: 3.45) mainly containing silicone acrylate of 500 cps viscosity were mixed in the volumetric proportion 3:1 and dispersed with stirring to thereby prepare a coating resin composition having a viscosity of 9500 cps.

Similarly to the Example 1, the outer surface of silver-plated copper wire having a 200 μm external diameter was coated with the coating resin composition thus prepared by dispersion of the microspheres having the uniform particle diameter, and then hardened by use of an ultraviolet-ray hardening apparatus to thereby prepare an insulated conductor having a coating thickness of 100 μm and an external diameter of 400 μm (Comparative product).

The void ratio of the insulating layer of the insulated conductor was 65%, and the dielectric constant thereof was 1.80. In short, the insulated conductor has a relatively low void ratio and a relatively high dielectric constant compared with that of Example 4.

As described above, according to the present invention, a thin-film coated insulated conductor which is small in diameter but low in capacitance can be manufactured stably with no variations in capacitance due to the manufacturing process and with a speed higher than the prior art. The resulting insulated conductor has capacitance of a designed value and has a smooth coating layer surface.

According to the present invention, a small-diameter but low-capacitance insulated conductor in which the dielectric constant of the coating layer is not larger than 1.60 when the thickness of the insulating layer is not larger than 200 μm can be put into practical use, though such an insulated conductor could not be obtained in the prior art. Accordingly, the range of its use as a high-speed transmission insulated conductor requested for high-density signal transmission line in medical measuring machines, computer measuring machines and the like can be enlarged remarkably.

What is claimed is:

1. An insulated conductor coated on its outer surface with an insulating layer, said insulating layer comprising:
    an energy irradiation curable resin; and
    microspheres, having a shell portion made of vinylidene chloride-acrylonitrile copolymer, mixed in said resin.

2. An insulated conductor coated on its outer surface with an insulating layer, said insulating layer comprising:
    an ultraviolet ray curable resin selected from the group of resins consisting of silicone, silicone acrylate, fruoroacrylate and phenol; and
    microspheres mixed in said resin.

3. A method of producing an insulating conductor, comprising the steps of:
    mixing microspheres of at least two groups having different mean diameters into an ultraviolet ray curable resin composition to prepare a coating resin composition;
    applying said coating resin composition to an outer surface of said conductor; and
    hardening said coating resin composition through ultraviolet radiation to form a coating layer;
    said ultraviolet ray curable resin consisting of a resin selected from the following group, silicone, silicone-acrylate, flouroacrylate and phenol.

4. A method of producing an insulating conductor, comprising the steps of:
    mixing microspheres into an ultraviolet ray curable resin composition to prepare a coating resin composition;
    applying said coating resin composition to an outer surface of said conductor; and
    hardening said coating resin composition through ultraviolet radiation to form a coating layer;
    said ultraviolet ray curable resin consisting of a resin selected from the following group, silicone, silicone-acrylate, flouroacrylate and phenol.

5. A method of producing an insulating conductor, comprising the steps of:
    mixing microspheres into an energy irradiation curable resin composition to prepare a coating resin composition;
    applying said coating resin composition to an outer surface of said conductor; and
    hardening said coating resin composition through energy irradiation to form a coating layer;
    said microspheres having a shell portion consisting of venylidene chloride-acrylonitrile copolymer.

* * * * *

UNITED STATES PATENT AND TRADEMARK OFFICE
CERTIFICATE OF CORRECTION

PATENT NO. : 5,115,103
DATED : May 19, 1992
INVENTOR(S) : YAMANISHI et al.

It is certified that error appears in the above-identified patent and that said Letters Patent is hereby corrected as shown below:

Column 8, line 28, change "silicon" to --silicone--.

Column 8, line 29, change "22:0.8:1" to --2.2:0.8:1--.

Signed and Sealed this

Seventh Day of March, 1995

Attest:

Attesting Officer

BRUCE LEHMAN

Commissioner of Patents and Trademarks